C. E. MILLER.
Broom Head.

No. 48,195.

Patented June 13, 1865.

Witnesses
J. Millward
C. L. Fisher

Inventor
Charles E. Miller
By Knight Bros
Attys

UNITED STATES PATENT OFFICE.

CHARLES E. MILLER, OF CINCINNATI, OHIO.

IMPROVED BROOM-HEAD.

Specification forming part of Letters Patent No. 48,195, dated June 13, 1865.

*To all whom it may concern:*

Be it known that I, CHARLES E. MILLER, of Cincinnati, Hamilton county, Ohio, have invented a new and useful Improvement in Metallic Broom-Heads; and I do hereby declare the following to be a full, clear, and exact description thereof, reference being had to the accompanying drawings, making a part of this specification.

This invention relates to an arrangement of open-work metallic clamps, articulated by a detachable hinge at that part of them most remote from the handle, and terminating at their other end in two semi-cylindrical projections, which embrace the butt-end of the handle and are secured by a ring or ferrule.

Figure 1:
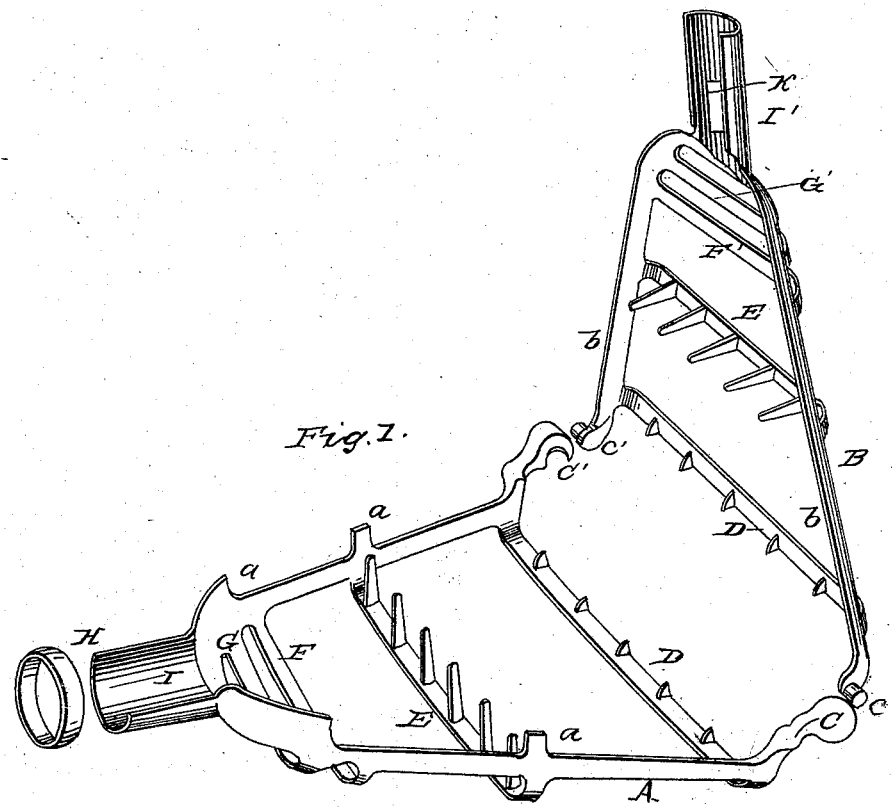
Figure 2:
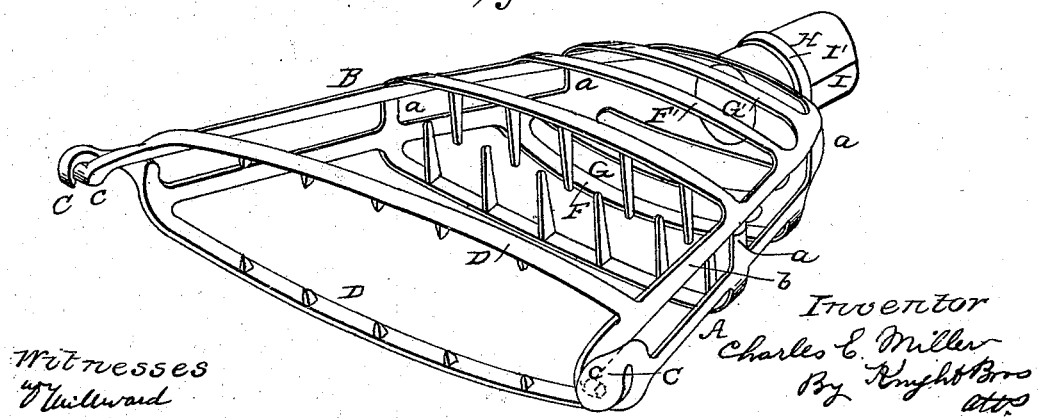

Figure 1 represents the two jaws or clamps separated. Fig. 2 represents the same closed.

A is the lower jaw, having an elevated curb or margin, $a$, and elevated hinge-sockets C C', so as to form a trough or receptacle for the stalks of the broom.

D E F G are cross-bars, which serve to connect the sides or curbs and to confine the stalks.

B is the upper jaw, provided with similar cross-bars, D' E' F' G', but having a very slightly turned or raised margin, $b$, and slightly raised pintles $c$ $c'$, to occupy the sockets C C'. The bars D D' and E E' are armed with teeth, which, when the head is closed together, serve to gripe and hold the stalks. Of these teeth those on the jaws E E' are much the longer, and are so arranged as to alternate between each other. The sockets C C' and the pintles $c$ $c'$ project so much beyond the bars D D' as to cause the opening of the jaws to be accompanied by a much larger opening of the said bars than when the jaws are closed together.

H is a ring or ferrule, which, when the jaws have been closed together over the corn, is slipped over the semi-cylindrical projections I I', so as by the same means and movement to secure both the handle and the stalks of broom-corn into the head.

It will be seen that the stalks may be deposited in the jaw A in the precise position and quantity desired for the broom, the elevated margins of the said jaw serving to confine the outer portions, and the large opening between the bars D enabling an ample quantity of corn to be inserted. The corn having been properly disposed, the upper jaw, B, is now brought down, and the bars D closing on both sides of the corn act to nip the same and prevent its escape endwise out of the head while the jaws are closed together, so that there is absolutely no subsequent adjustment or rearrangement of the stalks necessary.

I claim herein as new and of my invention—

1. Connecting the jaws of a metallic broom-head by a detachable or separable hinge or articulation at the point of the head or that part of the same farthest from the handle.

2. In combination with the above, the sockets C C' and pintles $c$ $c'$, when formed upon the ends of arms projecting downward from the lower bars, D D', as and for the purposes specified.

In testimony of which invention I hereunto set my hand.

CHAS. E. MILLER.

Witnesses:
GEO. H. KNIGHT,
JAMES H. LAYMAN.